United States Patent Office 3,072,717
Patented Jan. 8, 1963

3,072,717
RECOVERY OF ISOPHTHALIC AND TEREPHTHALIC ACIDS
Ralph Mason Pritchett, Corpus Christi, Tex., and Oliver H. Axtell, Summit, N.J., assignors to Celanese Corporation of America, New York, N.Y., a corporation of Delaware
No Drawing. Filed Nov. 29, 1957, Ser. No. 699,514
8 Claims. (Cl. 260—524)

This invention relates to the oxidation of aromatic compounds to produce phthalic anhydride and relates more particularly to the removal of the isophthalic acid or terephthalic acid which is produced as a side product in said oxidation reaction.

The production of phthalic anhydride by the oxidation of a mixture containing o-xylene, o-toluic acid and phthalide is disclosed in the copending application of Leo L. Contois and Hopkins W. Tatum, Serial No. 660,490, filed May 21, 1957, now U.S. 2,925,425, which application is hereby incorporated, in its entirety, by reference. o-Xylene commonly contains m-xylene as an impurity. In the oxidation reaction this m-xylene will be converted, at least in part, to isophthalic acid, which may contaminate the desired products. Similarly, when the o-xylene contains p-xylene as an impurity, the product contaminant will be terephthalic acid.

Isophthalic and terephthalic acids are substantially insoluble in the reaction mixture produced in the oxidation reaction of the Contois and Tatum application and the isophthalic acid or terephthalic acid can therefore be removed from the reaction mixture by filtration or centrifugation, but the direct application of these methods has disadvantages. For example, the reaction mixture is hot and inflammable, so that a fume and fire hazard exists unless specially designed equipment is used. If the mixture is cooled as a preliminary step, some of the dissolved constituents may precipitate out on the cooling surfaces and foul the equipment. If the mixture is not cooled, the simpler types of vacuum filter cannot be used because solids may precipitate in the pores of the filter medium as the application of the vacuum results in evaporation and cooling in the filter medium. Pressure filters, which would not cause cooling, involve high costs for operating labor, or else high investment costs for continuous pressure filters. Another difficulty is that an appreciable amount of liquid reaction product will adhere to the solids removed by a filter or centrifuge, and this will constitute a process loss unless it is recovered through additional processing.

It is an object of this invention to provide an improved process for the removal of the isophthalic acid from a reaction mixture containing dissolved phthalic anhydride and solid isophthalic acid or terephthalic acid.

Other objects of this invention will be apparent from the following detailed descriptions and claims. In this description and claims the proportions are by weight unless otherwise specified.

In accordance with one aspect of this invention, a crude mixture containing dissolved phthalic anhydride and suspended isophthalic acid or terephthalic acid is treated with an organic water-immiscible liquid to produce a slurry of the isophthalic acid or terephthalic acid in a medium having a reduced concentration of phthalic anhydride. Preferably, the crude mixture is washed with the organic water-immiscible liquid so that the resulting slurry consists essentially of said liquid and isophthalic acid or terephthalic acid. After this treatment, the resulting slurry is brought into contact with an aqueous medium under such conditions that two liquid phases form, with aqueous medium constituting the denser phase. The isophthalic acid or terephthalic acid particles, which are denser than the aqueous medium, leave the organic phase and settle into the aqueous phase, under the influence of gravity or centrifugal force. From the aqueous phase, they can be removed easily.

This invention finds its greatest utility in connection with the treatment of oxidation reaction mixtures obtained by the process of the aforesaid Contois and Tatum application. The proportion of solid isophthalic acid or terephthalic acid present in such oxidation reaction mixtures is generally relatively small, on the order of a few percent or less and it is therefore advantageous to separate a large portion of the liquid so as to produce a thick suspension of the isophthalic acid or terephthalic acid, before the treatment with the organic liquid. Such separation may be effected in any suitable equipment, such as a settling tank, a cyclone separator or a centrifugal clarifier. It is desirable that this separation be effected until the resulting suspension contains at least 5%, preferably 15 to 30%, isophthalic acid or terephthalic acid, or both. Some of the constituents of the reaction mixture, e. g. the o-toluic acid and phthalic anhydride, tend to precipitate out when the reaction mixture is cooled, and the suspension of isophthalic acid or terephthalic acid in said reaction mixture should therefore be maintained hot (e.g. at a temperature of 80 to 200° C. and preferably under sufficient superatmospheric pressure to prevent boiling) throughout the separation step, in order to prevent such precipitation. The separated liquid may be treated for recovery of phthalic anhydride therefrom in the manner described in the aforesaid Contois and Tatum application.

The organic liquid used for treating the thick suspension is preferably o-xylene, which may be of the same grade as used in the oxidation reaction and may contain, for example, 5 to 15% m-xylene or p-xylene. It is a non-solvent for isophthalic acid or terephthalic acid, and, particularly at elevated temperatures, a solvent for the other constituents of the reaction mixture. In the preferred process, in which the suspension is washed with the o-xylene, the treatment may be carried out continuously by feeding the suspension into the top of a vertical vessel and feeding the o-xylene into the lower part of the same vessel, the desired slurry of isophthalic acid or terephthalic acid in o-xylene being recovered from the bottom of the vessel. Alternatively, the suspension may be fed continuously to a centrifugal clarifier, the o-xylene being introduced continuously into the slurry-discharge end of the clarifier in such a fashion as to displace substantially all of the original liquid of said suspension. The washing may also be effected in one or more tanks equipped with agitators. For best results, none of o-toluic acid phthalic anhydride or other dissolved constituents of the suspension should precipitate during the treatment and it is therefore desirable to carry out at least the first stages of the washing step (i.e. the stages when the concentration of the dissolved constituents is highest) at an elevated temperature e.g. about 80 to 200° C. and, when operating in the upper portions of this range, at a superatmospheric pressure so as to prevent boiling. When the organic liquid is o-xylene, the liquid washings may be fed to the oxidation reaction of the aforesaid Contois and Tatum application, with or without previous treatment to recover their phthalic anhydride content.

Instead of washing the thick suspension of isophthalic acid, this suspension may be simply diluted with the o-xylene or other added organic liquid. In this case the resulting slurry will contain, besides the isophthalic acid and organic liquid, appreciable proportions of the phthalic anhydride, o-toluic acid, phthalide and other avluable constituents of the reaction mixture. Here again the diluted mixture should be maintained hot to avoid precipitation; though the greater the dilution, the lower the temperature can be. After dilution it is most economical to withdraw a portion of the diluted liquid from the resulting slurry, e.g. by decantation, and it will be apparent that when such a withdrawal step is employed the procedure will be, in effect, a washing of the suspension.

After the washing or dilution steps, the slurry preferably contains about 15% to 30% isophthalic acid or terephthalic acid. As stated the slurry is next brought into contact with an aqueous medium. It is important that the density of the aqueous medium be greater than the density of the liquid portion of the slurry, so that the isophthalic acid or terephthalic acid particles will settle into the aqueous medium. For reasons of economy and ease of handling, ordinary water is the preferred aqueous medium. The density of the liquid portion of the original reaction mixture (containing o-xylene, phthalic anhydride, phthalide, o-toluic acid etc.) is greater than that of water, but the washing or dilution treatment described above is preferably such as to lower the density. In place of ordinary water, a more dense aqueous medium such as a saturated aqueous solution of a salt, e.g. NaCl, $Na_2SO_4$, or $MgSO_4$, may be employed. The aqueous medium may containing a wetting agent, e.g. of about 1% of sodium dodecyl benzene sulfonate to aid in the passage of isophthalic acid or terephthalic acid particles, free of organic liquid, into the water phase, particularly when gravity settling is employed. It is most convenient to use water at ambient temperature at this stage.

A conventional agitated tank or other suitable apparatus may be employed for bringing the aqueous medium into contact with the slurry of isophthalic acid or terephthalic acid. Thereafter the resulting mixture may be passed into a settling tank, centrifugal clarifier or other appropriate device where the isophthalic particles settle into the aqueous phase. Thus, the slurry of isophthalic acid in organic liquid may be introduced, at an intermediate height, into a settling tank filled with the aqueous medium; the organic liquid, being less dense, will float to the top and is suitable for reuse, while the isophthalic acid or terephthalic acid particles will settle into the aqueous medium. Removal of these particles from the aqueous medium is simple, and the medium may be recycled for contact with further quantities of the slurry of isophthalic or terephthalic acid in organic solvent.

It will be observed that by the process of the present invention, all, of a major part of, the phthalic anhydride in the original reaction mixture is removed from contact with the isophthalic acid before the latter is brought into contact with water. Thus there is little or no loss of phthalic anhydride through hydrolysis to phthalic acid and consequent dissolution in the aqueous medium.

The following example is given to illustrate this invention further.

*Example I*

Example VII of the aforesaid Contois and Tatum application is repeated except that the xylene fed to the system contains 90% o-xylene and 10% m-xylene. The resulting hot liquid reaction mixture, containing suspended isophthalic acid particles, as well as dissolved o-toluic acid, m-toluic acid and phthalide, is fed to a settling tank, maintained at a temperature of 100° C. and atmospheric pressure from which a thick suspension containing 15% isophthalic acid is withdrawn. This suspension is washed in a centrifugal clarifier, at a temperature of 90° C. and atmospheric pressure, with o-xylene containing 10% m-xylene, to produce a slurry, substantially free of the original liquid, containing 15% isophthalic acid and the balance xylenes. This slurry is mixed with 100% of its weight of water, at a temperature of 40° C. and an atmospheric pressure and the mixture is passed to a settling tank. An upper layer of xylenes free of isophthalic acid is drawn off from the top of the settling tank, while a suspension of isophthalic acid in water is taken from the bottom and filtered to recover the isophthalic acid.

It is to be understood that the foregoing detailed description is given merely by way of illustration and that many variations may be made therein without departing from the spirit of our invention.

Having described our invention what we desire to secure by Letters Patent is:

1. In a process of oxidizing a liquid containing o-xylene and obtaining a suspension of particles of at least one acid selected from the group consisting of isophthalic acid and terephthalic in a liquid comprising phthalic anhydride, the improvement of removing said acid comprising treating said suspension with an organic water-immiscible liquid which is a non-solvent for said acid to obtain a mixture containing said acid which is less dense than an aqueous medium, bringing said mixture into contact with said aqueous medium such that there is formed an organic liquid phase in contact with a lower aqueous phase, and effecting settling of said acid particles into said aqueous phase.

2. Process as set forth in claim 1 in which said organic liquid comprises o-xylene.

3. Process as set forth in claim 1 in which the treatment with the organic liquid comprises diluting said initial mixture with said liquid.

4. Process as set forth in claim 1 in which the treatment with the organic liquid comprises washing said initial mixture with said liquid to produce a slurry of isophthalic acid particles in said organic liquid.

5. Process as set forth in claim 1 in which the liquid portion of said initial mixture comprises o-xylene, phthalide, and o-toluic acid.

6. Process as set forth in claim 2 in which said organic liquid is at a temperature of about 80 to 200° C.

7. In a process of oxidizing a liquid containing o-xylene to obtain a reaction mixture comprising isophthalic acid particles suspended in a liquid medium comprising o-xylene, m-xylene, o-toluic acid, m-toluic acid, phthalic anhydride and phthalide, the improvement of removing isophthalic acid comprising mechanically removing a portion of said liquid medium to produce a suspension of about 5 to 30% of isophthalic acid, treating said suspension with an organic water-immiscible liquid, which is a non-solvent for isophthalic acid, to reduce the concentration of phthalic anhydride in contact with said isophthalic acid and obtain a mixture less dense than an aqueous medium, and then bringing the latter mixture into contact with said aqueous medium such that there is formed an organic liquid phase in contact with a lower aqueous phase, and effecting settling of said isophthalic acid particles from said organic liquid phase into said aqueous phase.

8. In a process of oxidizing a liquid containing o-xylene to obtain a reaction mixture comprising isophthalic acid particles suspended in a liquid medium comprising o-xylene, m-xylene, o-toluic acid, m-toluic acid and phthalide, the improvement of removing isophthalic acid comprising mechanically removing a portion of said liquid medium at a temperature of about 80 to 200° C., to produce a suspension of about 5 to 30% of isophthalic acid, washing said suspension with o-xylene at a temperature of about 80 to 200° C. to obtain a mixture less dense than water, and then bringing the latter mixture into contact with water to form a lower water phase and a less dense o-xylene phase, and effecting settling of said isophthalic acid particles from said o-xylene phase into said water phase.

References Cited in the file of this patent

UNITED STATES PATENTS

| | | |
|---|---|---|
| 2,569,440 | Agnew et al. | Oct. 2, 1951 |
| 2,572,710 | Emerson et al. | Oct. 23, 1951 |
| 2,785,198 | Grosskinsky | May 12, 1957 |
| 2,820,819 | Aroyan | Jan. 21, 1958 |
| 2,829,160 | Stehman | Apr. 1, 1958 |
| 2,838,565 | Heath et al. | June 10, 1958 |
| 2,863,913 | Raecke | Dec. 9, 1958 |
| 2,925,425 | Contois | Feb. 16, 1960 |

FOREIGN PATENTS

| | | |
|---|---|---|
| 1,125,014 | France | Oct. 23, 1956 |

OTHER REFERENCES

Seidel: Solubilities of Organic Compounds, vol. 2 (1941), pp. 572-5.